Oct. 25, 1966     A. FISCHER     3,280,875

ANCHORING SOCKET

Filed Jan. 29, 1963     2 Sheets-Sheet 1

INVENTOR.

ARTUR FISCHER

BY *Michael S. Striker*

*Attorney*

Oct. 25, 1966  A. FISCHER  3,280,875
ANCHORING SOCKET

Filed Jan. 29, 1963  2 Sheets-Sheet 2

INVENTOR.

ARTUR FISCHER

BY Michael S. Striker
Attorney

United States Patent Office
3,280,875
Patented Oct. 25, 1966

3,280,875
ANCHORING SOCKET
Artur Fischer, Tumlingen, Kreis Freudenstadt, Germany
Filed Jan. 29, 1963, Ser. No. 254,667
Claims priority, application Germany, Feb. 6, 1962,
F 35,947
4 Claims. (Cl. 151—41.73)

The present invention relates to anchoring sockets, and more specifically to an anchoring socket for securely anchoring a screw subjected to tension forces in a member of soft material, such as fiber board or the like.

Building constructions often include plates of heat insulating material such as fiber board or the like to which an outer layer of weather resisting material is attached. The outer layer may for instance consist of corrugated asbestos slate board which is attached to the fiber board plates by screws.

Considerable difficulties are encountered in constructions of this or similar type in that when the screws are tightened to press the corrugated asbestos slate board tightly against the fiber board plates, the end of the screws are quite often pulled out of the relatively soft material in which they are screwed so that a tight engagement of the two members cannot be maintained. It is known to use expansion bolts to provide for a more secure fastening, but such expansion bolts have not proven satisfactory in all cases, especially if the screws are to be screwed in rather soft material.

It is an object of the present invention to overcome the difficulties encountered in constructions of the type described.

It is a further object of the present invention to provide means for securely anchoring the end of a screw in a member of relatively soft material without the danger of pulling the screw out when the screw is subjected to considerable tension forces.

It is a further object of the present invention to provide for anchoring sockets for securely anchoring screws subjected to tension forces in a member of soft material such as fiber board or the like, and to provide for anchoring sockets or simple and rugged construction which can be mass produced at very reasonable costs and which will stand up perfectly in use.

With these objects in view, the anchoring socket according to the present invention for securely anchoring a screw subjected to tension forces in a member of soft material mainly comprises a tubular portion adapted to extend through a bore in the member, a head portion integral with one end of the tubular portion closing this one end and extending with an annular rim thereof beyond the outer periphery of the tubular portion so as to be adapted to abut against face portions of the member around the bore when the tubular portion is inserted in the bore, and means in the interior of the tubular portion for engagement with the threads of a screw adapted to be screwed from the other end into the tubular portion.

Preferably the anchoring socket is made from tough plastic material. The means in the interior of the tubular portion for engagement with the threads of a screw may be in the form of inner screw threads formed in the interior of the tubular portion, or a plurality of angularly displaced ribs may be provided integral with the tubular portion and extending inwardly in substantially radial direction, into which a screw thread will be tapped by screwing a screw into the interior of the tubular portion. To prevent turning of the anchoring socket during tightening of the screw, outer ribs may also be provided integral with the tubular portion and extending in radial direction from the outer surface thereof. Preferably the cross section of these outer ribs is wedge-shaped and preferably the ribs extend in longitudinal direction of said tubular portion from the head on one end toward the other end, tapering in width from the head toward the other end of the tubular portion.

An anchoring socket according to the present invention has the advantage that the rim of the head of the socket will form an increased abutment to assure proper anchoring of the screw even if the latter is subjected during tightening to considerable tension forces.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
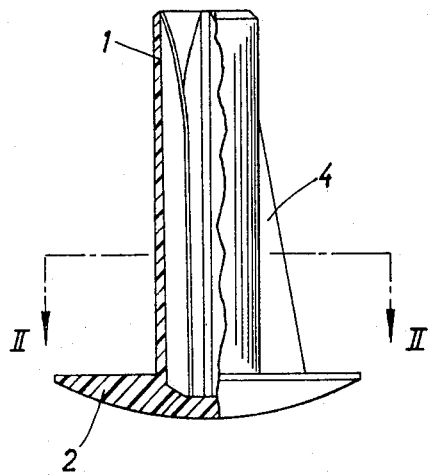
FIG. 1 is a partially sectioned side view of an anchoring socket according to the present invention.
Figure 2:
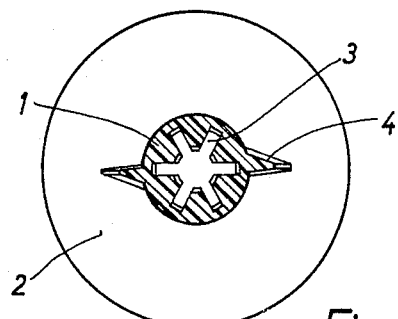
FIG. 2 is a cross section of the anchoring socket according to FIG. 1 taken along the line II—II and viewed in the direction of the arrows.

Referring now to the drawings and more specifically to FIGS. 1 and 2 of the same, it will be seen that the anchoring socket according to the present invention includes a tubular portion 1 and a substantially mushroom shaped head portion 2 integral with one end of the tubular portion 1, closing this one end, and extending with an annular rim thereof beyond the outer periphery of the tubular portion. The anchoring socket includes further means in the interior of the tubular portion for engagement with the threads of a screw adapted to be screwed from the upper open end into the tubular portion 1. These means are shown in the embodiment illustrated in FIGS. 1 and 2 as a plurality of ribs 3 integral with the tubular portion and extending angularly displaced from each other from the inner surface of the tubular portion inwardly in substantial radial direction and in longitudinal direction from the one to the other end of the tubular portion 1.

Preferably, the ribs 3 having at the inner surface of the tubular portion 1 a greater thickness than at the free end faces thereof and preferably the ribs taper in width from the lower closed end of the tubular portion 1 to the upper open end thereof, so that the inner free end facs of the ribs 3 are located on a cone surface having its widest diameter at the open end of the tubular portion 1. Preferably, the anchoring bolt of the present invention includes also outer ribs 4 and two such outer ribs are shown in the cross section of FIG. 2 extending from diametrical opposite portions in substantially radial direction outwardly from the tubular portion 1. The outer ribs 4 have preferably a wedge-shaped cross section as clearly shown in FIG. 2 and they extend from the rim of the head portion 2 in longitudinal direction of the tubular portion 1 of the anchoring socket while tapering in width from the head portion of the anchoring socket toward the opposite end thereof. Preferably the ribs end short of the other end of the tubular portion.

The anchoring socket of the present invention is preferably made from tough and age-resisting plastic material.

Figure 3:
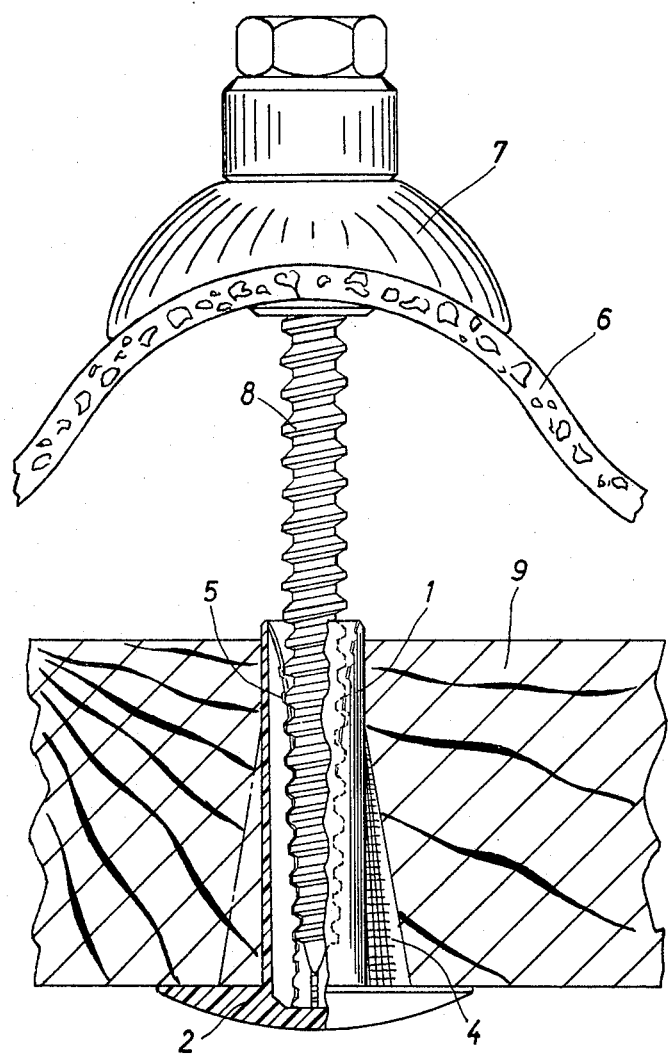
FIG. 3 is a partially sectioned side view of a slightly modified anchoring socket according to the present invention and showing also the application of the socket.

FIG. 3 illustrates the application of an anchoring socket according to the present invention in a construction in which a corrugated member 6, for instance a corrugated asbestos slate board, has to be secured tightly to a member 9 of relatively soft material, for instance fiber board. In the arrangement shown in FIG. 3, a bore 9a is formed through the fiber board plate 9 and the tubular portion 1 of an anchoring socket according to the present invention is inserted in the bore so that the head portion 2 of the socket will be located on the side of the fiber board 9 distant from the side to which the corrugated member has to be attached. A wood screw 8 is then extended through an opening in a cup shaped sealing member 7 placed against the crest portion of the corrugated member 6 and through an opening in the latter into the interior of the tubular portion 1 of the anchoring socket. The anchoring socket has in its interior radially inwardly extending ribs, as described before, but in the modification illustrated in FIG. 3 these ribs are provided with an inner screw thread 5. As shown in FIG. 3 the inner faces of the ribs are located substantially along a cone surface having its largest diameter at the upper open end of the tubular portion. Preferably, the screw thread 5 is cut with a pitch diameter slightly smaller than that of the screw thread provided on the screw 8 so that when the screw 8 is screwed into the interior of the tubular portion 1 a very tight engagement of the outer screw thread of the screw 8 with the inner screw thread 5 of the anchoring socket will result. When the screw 8 is tightened the anchoring socket will be pulled into the bore 9a until the flat face of the mushroom shaped head portion 2 will abut against the bottom surface of the member 9. The outer ribs 4 of the anchoring socket will prevent turning of the socket about its axis during tightening of the screw 8. The rim portion of the head 2 will provide a large abutment and assure a proper anchoring of the bolt of the screw 8, so that even when the non-illustrated portions of the corrugated member 6 are tightly pressed against the upper surface of the member 9 by tightening the screw, the screw will remain properly anchored.

Instead of providing the screw thread 5 in ribs projecting inwardly into the interior of the tubular portion 1 it is also possible to omit the ribs while increasing the wall thickness of the tubular wall portion 1 and to form a screw thread directly into the wall portion of the tubular portion. In this case, it is also preferred to form the inner surface of the tubular portion along a cone and to cut the screw thread with a pitch diameter slightly smaller than that of the outer screw thread of the screw 8 so that the two screw threads will tightly engage each other during screwing of the screw into the internally threaded tubular portion of the anchoring socket.

It will be understood that each of the elements described above, or two or more together, may also find a useful application in other types of anchoring sockets differing from the types described above.

While the invention has been illustrated and described as embodied in an anchoring socket for securely anchoring a screw subjected to tension forces in a member of soft material, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Anchoring socket for securely anchoring a screw subjected to tension forces in a member of soft material such as fiber board or the like and comprising a tubular portion adapted to extend through a bore in the member; a head portion integral with one end of said tubular portion closing said one end and extending with an annular rim thereof beyond the outer periphery of said tubular portion, said rim having an outer circumference substantially larger than the circumference of said tubular portion so as to be adapted to abut against relatively large face portions of the member around the bore when said tubular member extends through the bore; and means in the interior of said tubular portion for engagement with the threads of a screw adapted to be screwed from the other end into said tubular portion, said means including a plurality of ribs integral with said tubular portion and extending angularly displaced from each other from the inner surface of said tubular portion inwardly in substantial radial direction and in longitudinal direction from one to the other end of said tubular portion, said ribs having at said inner surface of said tubular portion a greater thickness than at inner free end faces thereof and said ribs tapering in width from said one to the other end of said tubular portion so that upon engagement of the means interior of said tubular portion with a screw said head portion is urged into abutment with the face portions of the member.

2. Anchoring socket of tough plastic material for securely anchoring a screw subjected to tension forces in a member of soft material such as fiber board or the like and comprising a tubular portion adapted to extend through a bore in the member; a head portion integral with one end of said tubular portion closing said one end and extending with an annular rim thereof beyond the outer periphery of said tubular portion, said rim having an outer circumference substantially larger than the circumference of said tubular portion so as to be adapted to abut against relatively large face portions of the member around the bore when said tubular member extends through the bore; means in the interior of said tubular portion for engagement with the threads of a screw adapted to be screwed from the other end into said tubular portion, said means including a plurality of ribs integral with said tubular portion and extending angularly displaced from each other from the inner surface of said tubular portion inwardly in substantial radial direction and in longitudinal direction from one to the other end of said tubular portion, said ribs having at said inner surface of said tubular portion a greater thickness than at the inner free end faces thereof and said ribs tapering in width from said one to the other end of said tubular portion; and at least one outer rib extending in axial direction of said tubular portion integrally connected at one longitudinal edge thereof to the outer surface of the tubular portion and extending from said edge in substantially radial direction so that in response to engagement of said means in the interior of said tubular members with the threads of a screw said tubular member in said bore is urged in the direction of said other end thereof causing said outer ribs to penetrate axially into the material of said member surrounding the bore so as to prevent rotational movement of said anchoring socket.

3. Anchoring socket of tough plastic material for securely anchoring a screw subjected to tension forces in a member of soft material such as fiber board or the like and comprising a tubular portion adapted to extend through a bore in the member; a head portion integral with one end of said tubular portion closing said one end an extending with an annular rim thereof beyond the outer periphery of said tubular portion, said rim having an outer circuference substantially larger than the circumference of said tubular portion so as to be adapted to abut against relatively large face portions of the member around the bore when said tubular member extends through the bore; means in the interior of said tubular portion for engagement with the threads of a screw adapted to be screwed from the other end into said tubular portion, said means including a plurality of ribs integral with said tubular portion and extending angularly displaced from each other from the inner surface of said tubular portion inwardly in substantial radial direction and in longitudinal direction from one to the other end of said tubular portion, said ribs having at said inner surface of said tubular portion a greater thickness than at inner free end faces thereof and said ribs tapering in width from said one to the other end of said tubular portion; and a pair of outer ribs of wedge-shaped cross section extending in axial direction of said tubular portion and each integrally connected at one longitudinal edge thereof to the outer surface of the tubular portion and respectively extending in diametrically opposite directions from said connected edge so that in response to engagement of said means in the interior of said tubular member with the threads of a screw said tubular member in said bore is urged in the direction of said other end thereof causing said outer ribs to penetrate axially into the material of said member surrounding the bore so as to prevent rotational movement of said anchoring socket.

4. Anchoring socket of tough plastic material for securely anchoring a screw subjected to tension forces in a member of soft material such as fiber board or the like and comprising a tubular portion having a smooth substantially cylindrical external surface adapted to extend through a bore in the member; a head portion integral with one end of said tubular portion closing said one end and extending with an annular rim thereof beyond the outer periphery of said tubular portion, said rim having an outer circumference substantially larger than the circumference of said tubular portion so as to be adapted to abut against relatively large face portions of the member around the bore when said tubular member extends through the bore; means in the interior of said tubular portion for engagement with the threads of a screw adapted to be screwed from the other end into said tubular portion, said means including a plurality of ribs integral with said tubular portion and extending angularly displaced from each other from the inner surface of said tubular portion inwardly in substantial radial direction and in longitudinal direction from one to the other end of said tubular portion, said ribs having at said inner surface of said tubular portion a greater thickness than at inner free end faces thereof and said ribs tapering in width from said one to the other end of said tubular portion; and a pair of outer ribs of wedge-shaped cross section extending in axial direction of said tubular portion and each integrally connected at one longitudinal edge thereof to the outer surface of the tubular portion and respectively extending in diametrically opposite directions from said connected edge, each of said outer ribs being integral at one end edge thereof with said rim of said head portion and tapering from said one end edge toward the other end of said tubular portion, said ribs extending along a major portion of the length of said tubular portion from said one end toward said other end thereof so that in response to engagement of said means in the interior of said tubular member with the threads of a screw said tubular member in said bore is urged in the direction of said other end thereof causing said outer ribs to penetrate axially into the material of said member surrounding the bore so as to prevent rotational movement of said anchoring socket.

References Cited by the Examiner

UNITED STATES PATENTS

| 1,248,004 | 11/1917 | Pleister | 85—83 |
| 1,765,614 | 6/1930 | Roberts et al. | 85—1 |
| 2,096,335 | 10/1937 | Nicholas | 151—41.73 |
| 2,632,479 | 3/1953 | Pfeil et al. | |
| 2,765,697 | 10/1956 | Brush | 85—80 |

FOREIGN PATENTS

| 1,028,629 | 2/1953 | France. |

CARL W. TOMLIN, *Primary Examiner.*

EDWARD C. ALLEN, *Examiner.*

E. B. ELDERKIN, *Assistant Examiner.*